United States Patent
Acker (10) Patent No.: US 7,235,316 B2
(45) Date of Patent: Jun. 26, 2007

(54) INTEGRATED HEAT MANAGEMENT OF ELECTRONICS AND FUEL CELL POWER SYSTEM

(75) Inventor: William P. Acker, Rexford, NY (US)

(73) Assignee: MTI MicroFuel Cells Inc., Albany, NY (US)

( * ) Notice: Subject to any disclaimer, the term of this patent is extended or adjusted under 35 U.S.C. 154(b) by 22 days.

(21) Appl. No.: 10/213,987

(22) Filed: Aug. 7, 2002

(65) Prior Publication Data

US 2004/0028961 A1  Feb. 12, 2004

(51) Int. Cl.
  H01M 8/00  (2006.01)
  H01M 2/00  (2006.01)

(52) U.S. Cl. ............... 429/13; 429/12; 429/14

(58) Field of Classification Search ........... 429/12, 429/13, 34
See application file for complete search history.

(56) References Cited

U.S. PATENT DOCUMENTS

| | | | |
|---|---|---|---|
| 4,673,624 A | 6/1987 | Hockaday | |
| 4,810,597 A | 3/1989 | Kumagai et al. | |
| 5,523,177 A | 6/1996 | Kosek et al. | |
| 5,573,866 A | 11/1996 | Van Dine et al. | |
| 5,599,638 A | 2/1997 | Surampudi et al. | |
| 5,631,099 A | 5/1997 | Hockaday | |
| 5,723,228 A | 3/1998 | Okamoto | |
| 5,759,712 A | 6/1998 | Hockaday | |
| 5,766,786 A | 6/1998 | Fleck et al. | |
| 5,773,162 A | 6/1998 | Surampudi et al. | |
| 5,795,668 A | 8/1998 | Banerjee | |
| 5,916,699 A | 6/1999 | Thomas et al. | |
| 5,945,231 A | 8/1999 | Narayanan et al. | |
| 5,992,008 A | 11/1999 | Kindler | |
| 6,326,097 B1 * | 12/2001 | Hockaday | 429/34 |
| 2001/0021470 A1 * | 9/2001 | May et al. | 429/44 |
| 2002/0122966 A1 * | 9/2002 | Acker et al. | 429/24 |
| 2003/0082427 A1 * | 5/2003 | Prasad et al. | 429/34 |
| 2004/0224194 A1 * | 11/2004 | Acker | 429/13 |

OTHER PUBLICATIONS

"Fuel Cell", 1992 Fuel Cell Seminar, Program and Abstracts, pp. 233-236, 461-464.
"Miniaturized Fuel Cells for Portable Power", Helen L. Maynard and Jeremy P. Meyers, Lucent Technologies, 2000.
"Pocket-size PEMs", Paul Sharke, Mechanical Engineering.
"Polymer Electrolyte Fuel Cells as Potential Power Sources for Portable Electronic Devices", Shinshon Gottesfeld and Mahlon S. Wilson, pp. 486-517.

* cited by examiner

Primary Examiner—Dah-Wei Yuan
(74) Attorney, Agent, or Firm—James M. Behmke; Cesari & McKenna, LLP (57) ABSTRACT

A method and apparatus for managing heat generated by a device that is powered at least in part by a direct oxidation fuel cell. Additional heat tends to improve the reaction in the direct oxidation fuel cell, and so unwanted heat produced by a powered device can be harnessed to increase the temperature of the reaction in the direct oxidation fuel cell. By doing so, the performance of the fuel cell can be enhanced and the temperature of the heat-generating portion of the device maintained.

15 Claims, 13 Drawing Sheets

FIG. 10 ions and components,
including those which may be powered by DMFC systems,
INTEGRATED HEAT MANAGEMENT OF ELECTRONICS AND FUEL CELL POWER SYSTEM

BACKGROUND OF THE INVENTION

1. Field of the Invention

The present invention relates generally to the field of fuel cells and, more specifically, to a thermal management system that integrates a direct methanol fuel cell (DMFC) system and a device, in which the device is powered at least in part by the DMFC.

2. Background Information

Fuel cells are devices in which an electrochemical reaction is used to generate electricity. A variety of materials may be suited for use as a fuel depending upon the materials chosen for the components of the cell. Organic materials, such as methanol or natural gas, are attractive choices for fuel due to their high specific energy.

Direct oxidation fuel cell systems may be better suited for a number of applications in smaller mobile devices (e.g., mobile phones, handheld and laptop computers), as well as in some larger applications. Typically, in direct oxidation fuel cells, a carbonaceous liquid fuel in an aqueous solution (typically aqueous methanol) is introduced to the anode face of a membrane electrode assembly (MEA). The MEA contains a protonically-conductive, but electronically non-conductive membrane (PCM). Typically, a catalyst which enables direct oxidation of the fuel on the anode is disposed on the surface of the PCM (or is otherwise present in the anode chamber of the fuel cell). Diffusion layers are typically in contact with at least one of the catalyzed anode and cathode faces of the PCM to facilitate the introduction of reactants and removal of products of the reaction from the PCM, and also serve to conduct electrons. Protons (from hydrogen found in the fuel and water molecules involved in the anodic reaction) are separated from the electrons. The protons migrate through the PCM, which is impermeable to the electrons. The electrons thus seek a different path to reunite with the protons and oxygen molecules involved in the cathodic reaction and travel through a load, providing electrical power.

One example of a direct oxidation fuel cell system is a direct methanol fuel cell system or DMFC system. In a DMFC system, methanol in an aqueous solution is used as fuel (the "fuel mixture"), and oxygen, preferably from ambient air, is used as the oxidizing agent. There are two fundamental half reactions that occur in a DMFC which allow a DMFC system to provide electricity to power consuming devices: the anodic disassociation of the methanol and water fuel mixture into $CO_2$, protons, and electrons; and the cathodic combination of protons, electrons and oxygen into water. The overall reaction may be limited by the failure of either of these reactions to proceed to completion at an acceptable rate (more specifically, failure to oxidize the fuel mixture will limit the cathodic generation of water, and vice versa).

Typical DMFC systems include a fuel source, fluid and effluent management systems, and a direct methanol fuel cell ("fuel cell"). The fuel cell typically consists of a housing, and a membrane electrode assembly ("MEA") disposed within the housing. A typical MEA includes a centrally disposed protonically conductive, electronically non-conductive membrane ("PCM") such as Nafion®, a registered trademark of E. I. Dupont de Nours and Company, which is a cation exchange membrane comprised of perfluorosulfonic acid, in a variety of thicknesses and equivalent weights. The PCM is typically coated on each face with an electrocatalyst such as platinum, or platinum/ruthenium mixtures or alloy particles. On either face of the catalyst coated PCM, the MEA typically includes a diffusion layer. The diffusion layers function to evenly distribute the liquid and gaseous reactants to, and transport the liquid and gaseous products of the reactions from the catalyzed anode face of the PCM, or the gaseous oxygen from air or other source across the catalyzed cathode face of the PCM. The diffusion layers also facilitate the collection of electrons and conduction to the device being powered. In addition, flow field plates may be placed on the aspect of each diffusion layer that is not in contact with the catalyst-coated PCM to provide mass transport of the reactants and by products of the electrochemical reactions and also have a current collection functionality to collect and conduct electrons through the load.

One problem with electronic systems and components, including those which may be powered by DMFC systems, is that electronic components and subsystems can become overheated, and their performance compromised. This problem is especially difficult to effectively address in small mobile devices where electronic components are packed tightly together and space, weight, and volume are critical design criteria. In such devices, it is desirable to minimize the number of components dedicated to cooling the system. Also, as mobile devices become more powerful and require more power, mobile device components produce increasing amounts of heat. Accordingly, it is increasingly important to remove heat from the electronic components and systems.

DMFCs are efficient at dissipating heat that is generated within the system, due to the fact that there are several fluids present in the system, and due to the fact that air is exchanged within the fuel cell system, allowing for a more natural heat exchange. In addition, the direct oxidation fuel cell systems and DMFCs demonstrate increased current generation (at a given voltage) at higher temperatures due to the increased kinetics of the reactions. Thus, if additional heat is applied to the reaction, the DMFCs can become an even more suitable power source.

It is thus an object of the invention to provide a thermal management system that provides temperature regulation of a device powered at least in part by a DMFC system, in which excess heat produced by the device is transferred to the DMFC. As a result of this heat transfer, the temperature of the device is kept within a desired range and the operation of the DMFC is improved.

SUMMARY OF THE INVENTION

In brief summary, the present invention provides a thermal management system that integrates a direct methanol fuel cell system and a device which is powered at least in part by the DMFC system. The invention provides the ability to transfer heat from the device to the DMFC system, which results in at least two benefits: the operating temperature of the device is regulated, and the DMFC's performance is enhanced.

In a first embodiment, the DMFC or some of its components are placed in contact with the device, allowing for the conduction of heat from the device to the DMFC. This is preferably achieved by placing at least one aspect of the housing of the DMFC system in direct contact with the device or by passing reactants close to the device before the reactants are reacted within the DMFC. A similar approach based on heat transfer via a small fluid gap, wherein heat is transferred through air or a "thermal grease" is also contemplated. In a second embodiment, thermally conductive components are preferably integrated into the device to transfer heat from the device to the DMFC system, allowing better heat transfer.

In a third embodiment, air may be directed over the device before introduction to the cathode face of the DMFC, depending on the desired heat or humidity characteristics. If air is directed over the device before introduction to the cathode face, it will remove heat from the heat generating electronics and increase the operating temperature of the DMFC, and tend to improve the kinetics of the reaction and the fuel cell system.

In a fourth embodiment, a pump in the DMFC is preferably used to circulate a dedicated coolant (i.e. not one of the reactants) through the device. The coolant removes heat produced by the device and transfers it to the DMFC where the heat is applied to the reactants.

In a fifth embodiment, a heat pump is used to transfer heat from the device, which heat is used in turn to vaporize the reactants. The vaporized reactants are condensed within the DMFC system prior to being reacted, thereby transferring heat to the DMFC.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
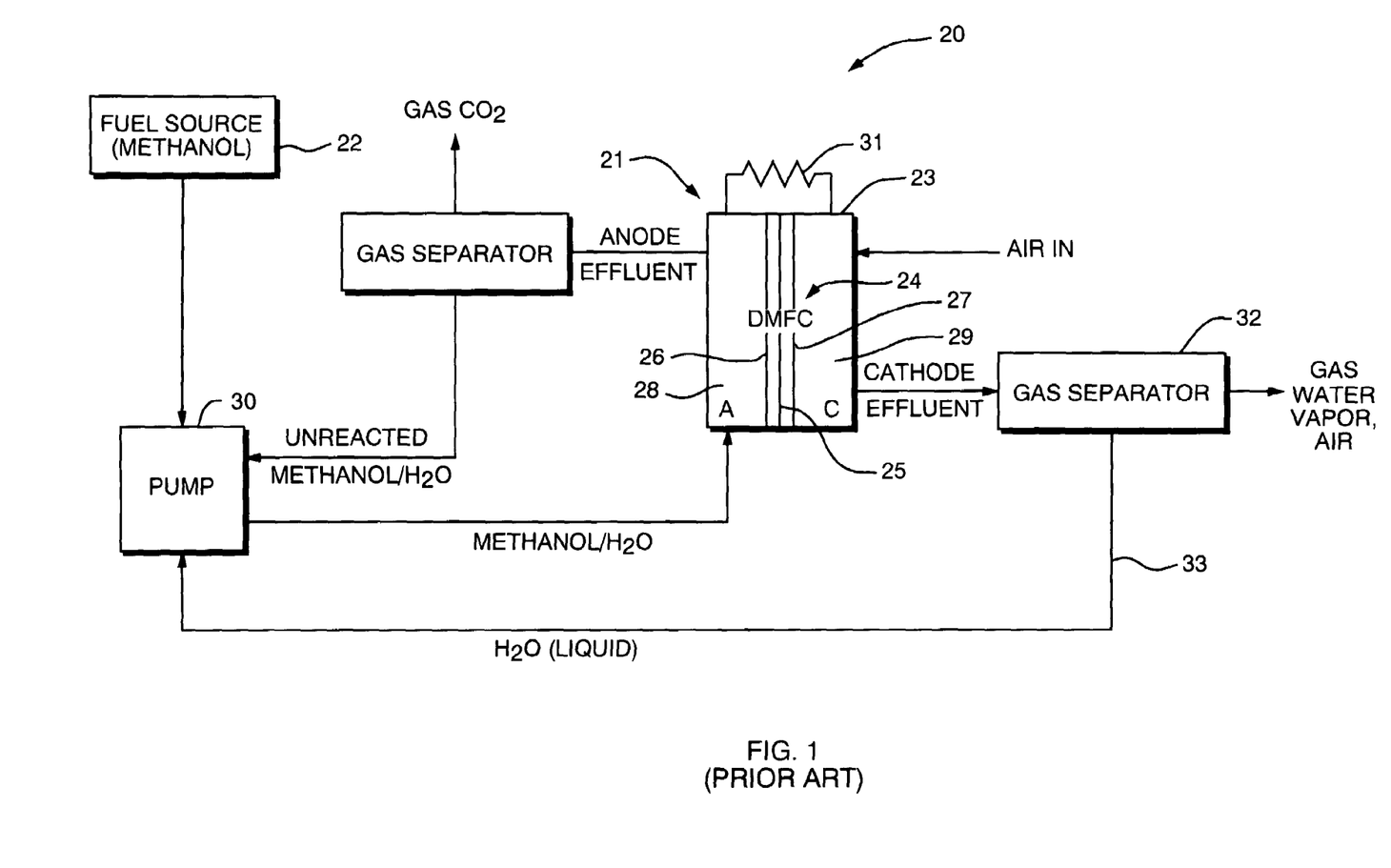
FIG. 1 is a block diagram of a direct methanol fuel cell system known in the prior art.

An example of a direct oxidation fuel system 20 is schematically illustrated in FIG. 1. The fuel cell system 20 includes a direct oxidation fuel cell, which may be a direct methanol fuel cell 21 ("DMFC"), for example. For purposes of illustration, and not by way of limitation, we herein describe an illustrative embodiment of the invention with DMFC 21, or DMFC system with the fuel substance being methanol or an aqueous methanol solution. However, it is within the scope of the present invention that other carbonaceous fuels such as ethanol, or combinations of carbonaceous fuels and aqueous solutions thereof may be used. It should be further understood that the invention is applicable to any fuel cell system where it is preferable to introduce a liquid fuel or component thereof to the anode aspect 26 of the membrane electrode assembly (MEA) 25 and not simply the embodiments described in FIG. 1.

The system 20, including the DMFC 21, has a fuel delivery system to deliver fuel from fuel source 22. The DMFC 21 includes a housing 23 that encloses a MEA 24. MEA 24 incorporates protonically conductive, electronically non-conductive, membrane (PCM) 25, and typically includes at least one diffusion layer in contact with one or both aspects of the PCM 25. PCM 25 has an anode face 26 and cathode face 27, each of which may be coated with a catalyst, including but not limited to platinum, or a blend of platinum and ruthenium. Diffusion layers are usually fabricated from carbon cloth or carbon paper that are treated with a mixture of Teflon® and high surface area carbon particles, are typically provided and in intimate contact with the catalyzed faces of each of the anode 26 and cathode 27 aspects of the PCM 25, though the invention is not limited to systems that require diffusion layers. The portion of DMFC 21 defined by the housing 23 and the anode face 26 of the PCM 25 is referred to herein as the anode chamber 28. The portion of DMFC 21 defined by the housing 23 and the cathode face 27 of the PCM 25 is referred to herein as the cathode chamber 29. The anode chamber 28 and cathode chamber 29 may further contain a flow field plate or plates (not shown) in contact with the diffusion layer, in order to manage the mass transport of reactants and products of the reaction. Those skilled in the art will recognize that the catalyst may be applied to the PCM 25 by applying a suspension containing the catalyst to PCM 25. As used herein the terms "anode face" and "cathode face" may refer to the catalyzed faces of the PCM 25, and shall include any residual catalyst materials that may remain on the surface of the PCM 25 as the result of such application.

As will be understood by those skilled in the art, electricity-generating reactions occur when a carbonaceous fuel mixture, including, but not limited to methanol or an aqueous methanol solution is introduced to the anode face 26, and oxygen, usually from ambient air, is introduced to the cathode face 27. More specifically, a carbonaceous fuel mixture from fuel source 22 is delivered by pump 30 to the anode chamber 28 of the DMFC 21. The fuel mixture passes through channels in the flow field plate (or is present in the anode chamber 28), and/or a diffusion layer, and is ultimately presented to the anode face 26 of the PCM 25.

Catalysts on the membrane surface (or which are otherwise present within the MEA 24) enable the anodic oxidation of the carbonaceous fuel on the anode face 26, separating hydrogen protons and electrons from the fuel and water molecules of the fuel mixture. Upon the closing of a circuit, protons pass through PCM 25, which is impermeable to the electrons. The electrons thus seek a different path to reunite with the protons, and travel through a load 31 of an external circuit, thus providing electrical power to the load 31. So long as the reactions continue, a current is maintained through the external circuit. Direct oxidation fuel cells produce water ($H_2O$) and carbon dioxide ($CO_2$) as products of the reaction, which must be directed away from the catalyzed anode and cathode membrane surfaces 26, 27. The gas separator 32 separates the excess air and water vapor from the water. This water can be later directed to the pump 30 via a flow path 33. Those skilled in the art will recognize that the gas separator 32 may be incorporated into an existing component within the DMFC 21 or the DMFC system 20.

Figure 2A:
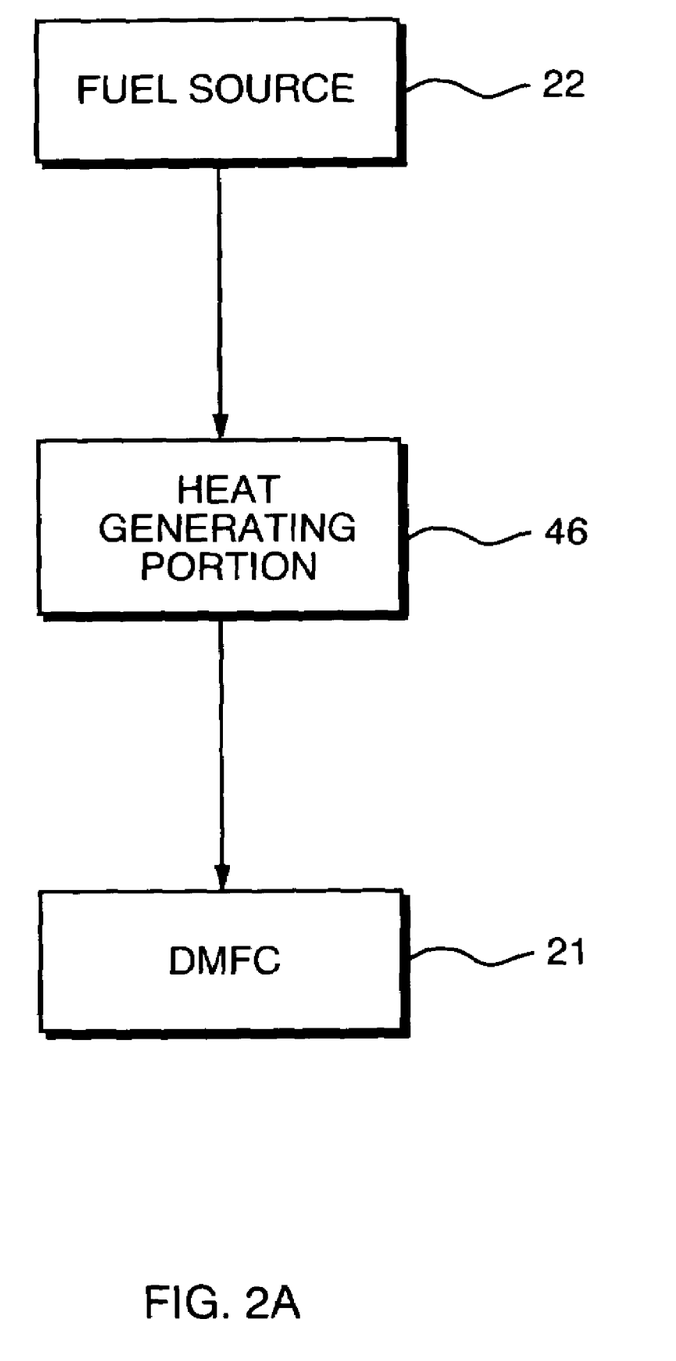
FIG. 2A is a schematic representation of fluid flow within the device powered by a fuel cell system.

FIG. 2A shows a more general schematic representation of the flow of the reactant from the fuel source 22 over the heat-generating portion 46 of the device, prior to delivering the reactant to the DMFC 21.

Figure 2B:
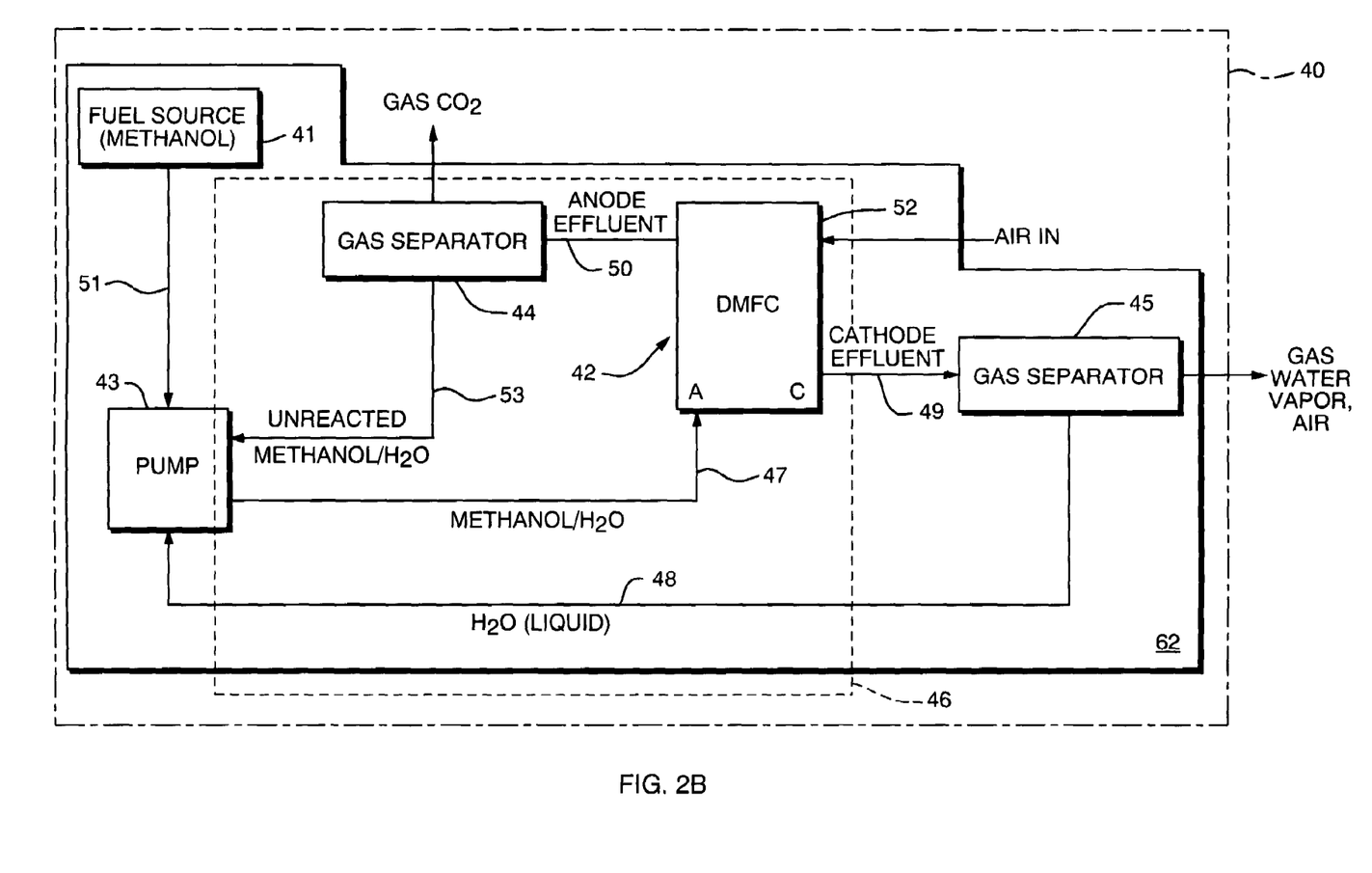
FIG. 2B is a block diagram of a direct methanol fuel cell system, constructed in accordance with a preferred embodiment of the present invention, in which heat generated by an device is regulated in accordance with the invention.

FIG. 2B shows an electronic device 40 which is powered at least in part by a direct methanol fuel cell system 62 placed in contact with or proximity to heat generating portion 46 of the device 40, thus enabling the conduction of heat from portion 46 to the DMFC 42 or related components. The DMFC system 62 may also include a battery, capacitor or other power storage device (not shown). Electronic device 40 may represent, for example, a wireless phone, notebook computer or any of a variety of other devices, which may be powered by a fuel cell. In this illustrative embodiment, some or all of a housing 52 of the DMFC 42, a gas separator 44, and conduits 47-50 and 53 that direct both the flow of reactants to the DMFC 42 and the flow of products from the DMFC 42 are preferably placed in direct contact with or in proximity to the portion 46. By placing conduits 47-50 and 53 in contact with or in proximity to portion 46, the conduits may conduct heat from portion 46, thereby heating the reactants flowing through the conduits. A similar approach based on convection may be used as well, as heat may be transferred from portion 46 to the DMFC 42 or related components indirectly.

Figure 3A:
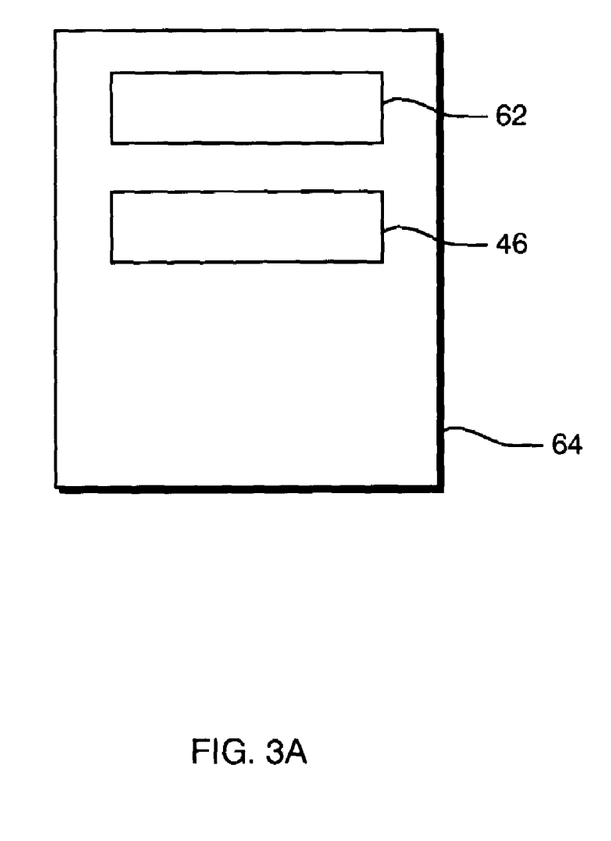
FIG. 3A is a perspective diagram of a device in which both the direct methanol fuel cell system powering the device and a heat-generating portion of said device are enclosed by a common housing.
Figure 3B:
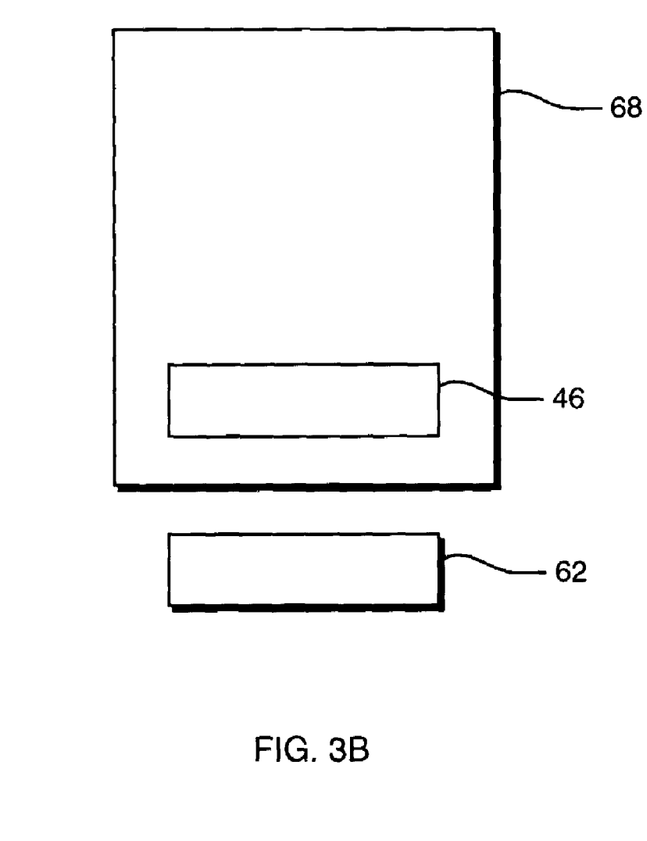
FIG. 3B is a perspective diagram of a device in which the direct methanol fuel cell system powering the device and a heat-generating portion of said device are enclosed by discrete housings.

FIGS. 3A and 3B show different configurations of a device powered at least in part by a DMFC system 62. In FIG. 3A, a single housing 64 contains both the DMFC system 62 powering the device 64 and the heat-generating portion 46 of said device 64, as well as other components which provide functionality. In FIG. 3B, the DMFC system 62 is not enclosed in the same housing that encloses the device 68. These are just two of many possible configurations recognizable to those skilled in the art. These figures are for illustration and not intended to limit or proscribe any possible couplings of the heat-generating portion of a device to the DMFC system.

Figure 4:
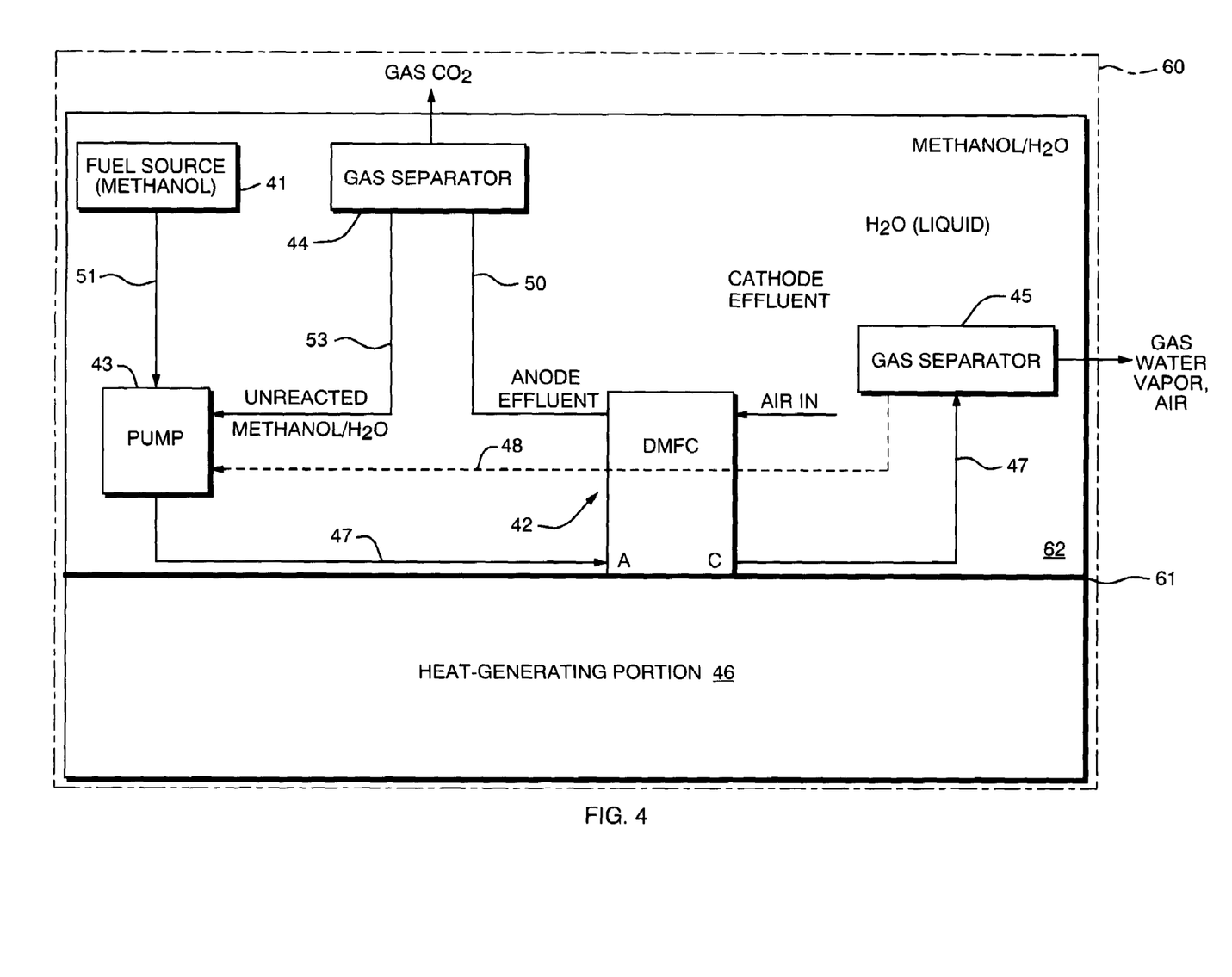
FIG. 4 is a block diagram of a direct fuel cell system in which a thermally conductive material is used to manage heat generated by a device.

FIG. 4 shows a second embodiment of the present invention in which a thermally conductive material 61, preferably made of a polymer but other materials such as metal could be used as well, is positioned between DMFC 42 (and possibly related components) and heat-generating portion 46, allowing for the transfer of heat from the portion 46 to DMFC 42. Those skilled in the art will appreciate that conductive material 61 may be placed in contact with some or all of other components (pump 43, gas separator 44, various conduits) in order to achieve a desired heat transfer rate, packaging requirements or other requirements of a particular application. Though the DMFC system 62 and the heat-generating portion 46 are shown as being in contact on a single plane, those skilled in the art will recognize that the interface may take place on more than one aspect between the heat generating portion 46 and the fuel cell system 62. Those skilled in the art will further recognize that the heat conducting material 61 may simply be comprised of an air gap and/or a "thermal grease".

Figure 5A:
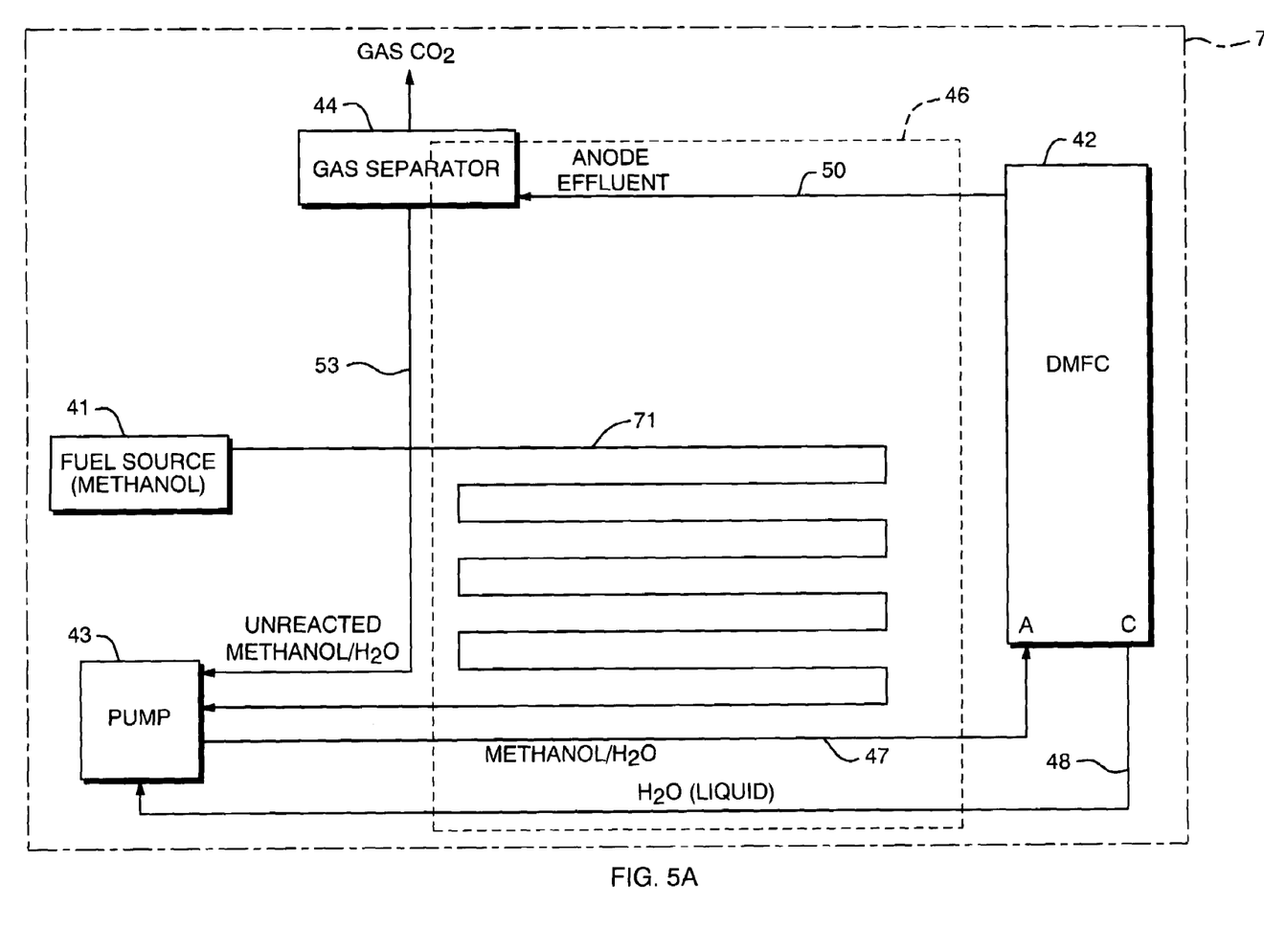
FIG. 5A is a block diagram of a direct methanol fuel cell system in which heat generated by a device is managed by transferring heat to fuel circulated in proximity to the device.
Figure 5B:
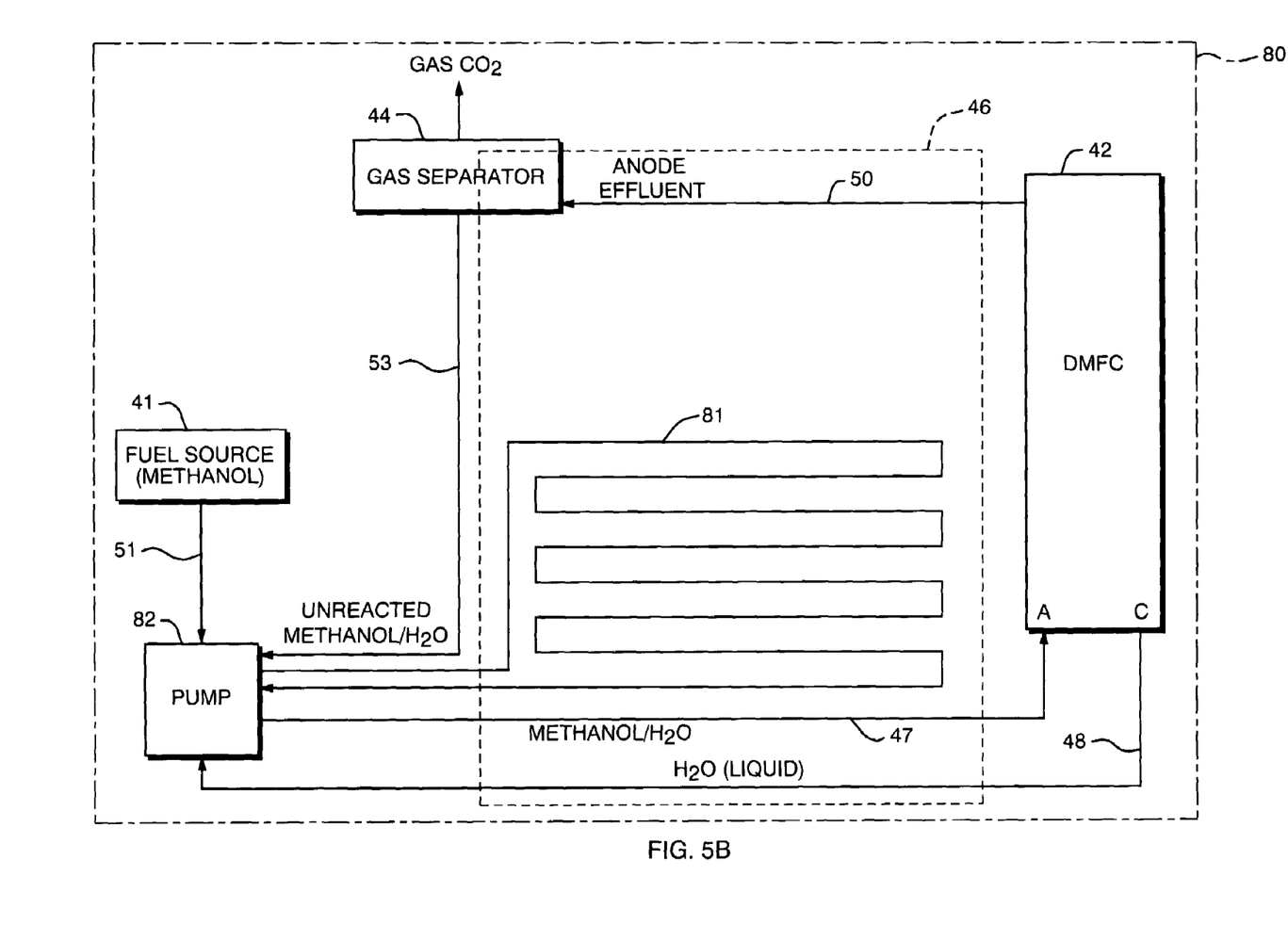
FIG. 5B is a block diagram of a direct methanol fuel cell system in which heat generated by a device is managed by transferring heat to a dedicated coolant circulated in proximity to the device.

FIG. 5A shows a third embodiment in which a conduit 71 between the fuel source 41 and the pump 43 is routed in proximity to heat-generating portion 46. Conduit 71 is preferably arranged in an elongated, serpentine configuration such that it presents a large surface area for heat transfer between heat generating portion 46 and the fuel in the conduit 71. The transferred heat increases the temperature of the fuel flowing in conduit 71, thus effectively transferring heat to DMFC 45. Conduit 71 may alternatively be placed in direct contact with portion 46, similar to FIG. 2. Conduit 71 is in substantially the same plane as the portion 46, though there may be instances where the conduit 71 extends along more than one aspect of the portion 46. Those skilled in the art will recognize that it is possible to implement conduits containing water or other reactants in a substantially similar fashion. Other variations include, but are not limited to, eliminating the gas separator 44, or anode fuel and recirculation components (conduits 50 and 53) so that the heat is conducted to the fuel after it leaves the fuel source 41 but before it enters the fuel cell 42. FIG. 5B shows an alternative embodiment in which fuel is delivered directly to a pump 82 which circulates a fluid through the heat-generating portion 46 in conduit 81. The fluid may be either; 1) a reactant; or 2) a dedicated coolant utilizing a separate, closed loop system (not shown) and may be used to absorb heat from the heat generating portion 46 and transmit it to the DMFC 42 after passing through conduit 81. The fluid is eventually returned to the pump 82 where heat may be transferred to the reactants that pass into the DMFC 42, or if the fluid is a reactants it may be delivered to the DMFC 42.

Figure 6:
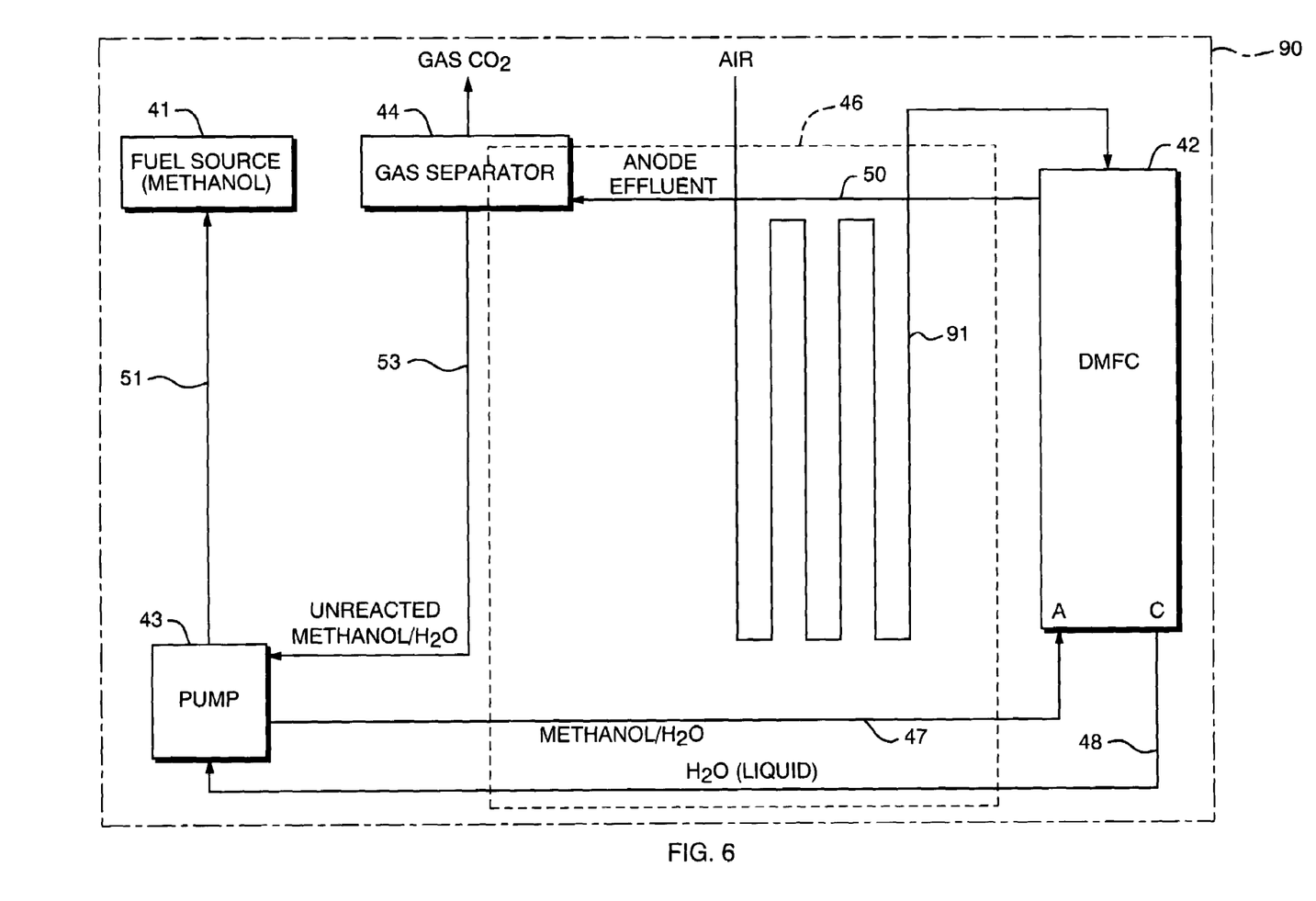
FIG. 6 is a block diagram of a direct methanol fuel cell system in which heat generated by a device is managed by transferring heat to air circulated through device.

FIG. 6 illustrates a fourth embodiment in which air passes through a conduit 91 in proximity to heat-generating portion 46, allowing heat to be transferred to the air before it is introduced to the DMFC 42. Like in the embodiment of FIG. 5A, a serpentine configuration of conduit 91 is preferable as this increases the surface area available for heat transfer, though other configurations are also within the scope of the invention. This embodiment may require a component to assist in air induction, such as a fan (not shown) to increase the volume of air that passes through the cathode chamber of the fuel cell 42. By introducing warmer air into the cathode of the DMFC 42, the kinetics of the cathodic reaction is enhanced, and performance of the DMFC 42 is increased.

Figure 7:
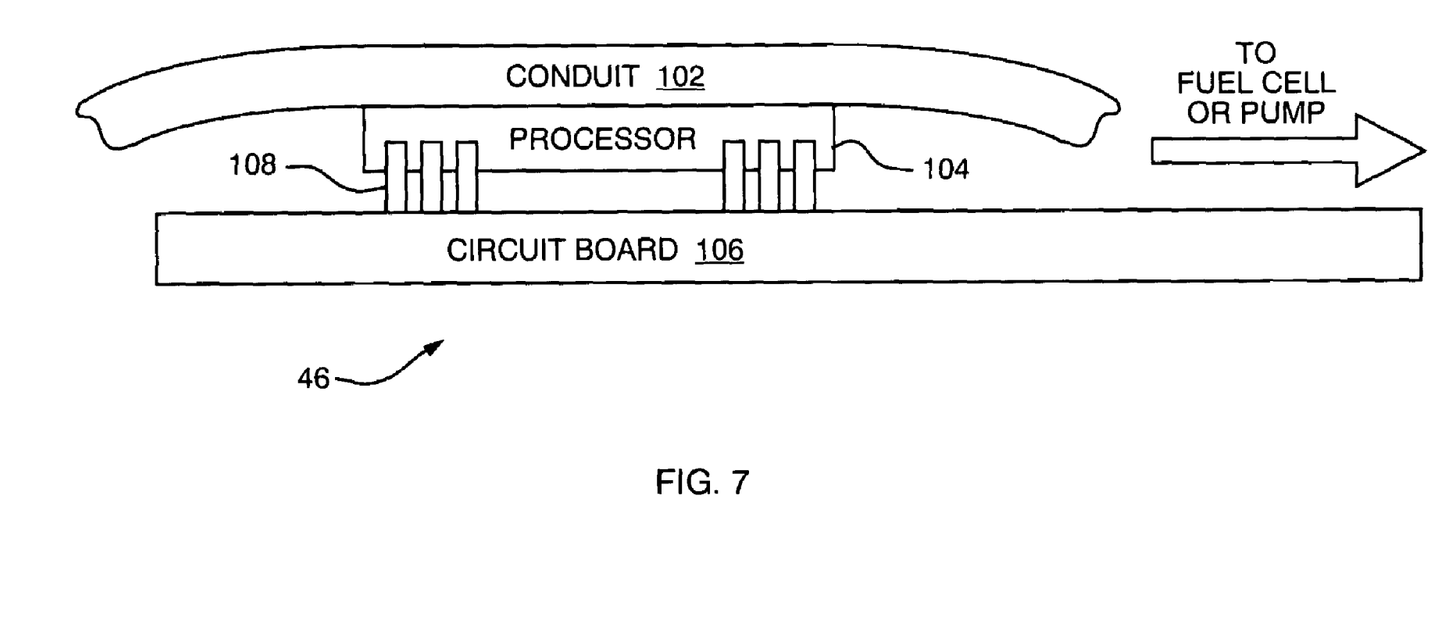
FIG. 7 is a perspective drawing of a circuit board in which heat is managed by conduction through a conduit running over the processor, carrying reactants to the direct methanol fuel cell or a pump, or a dedicated coolant to the pump.
Figure 8A:
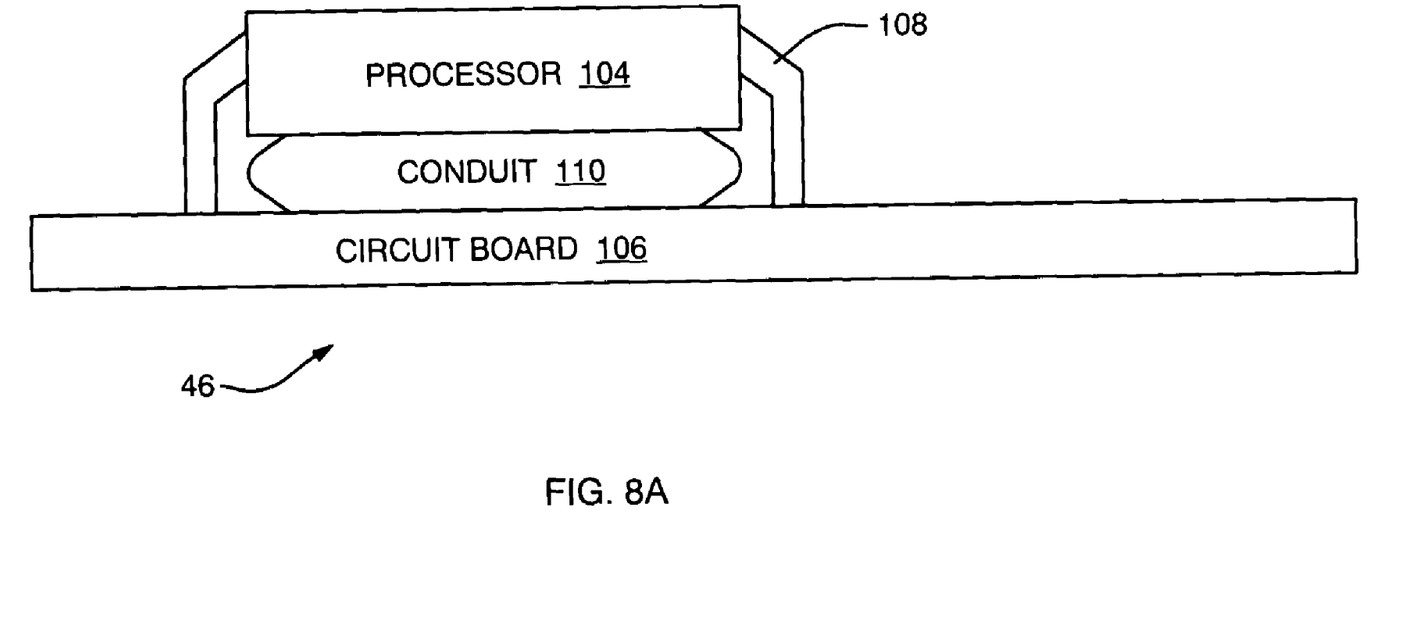
FIG. 8A is a perspective drawing of a circuit board in which heat is managed by conduction in which a conduit carries reactants to the direct methanol fuel cell or a pump, or a dedicated coolant to the pump.
Figure 8B:
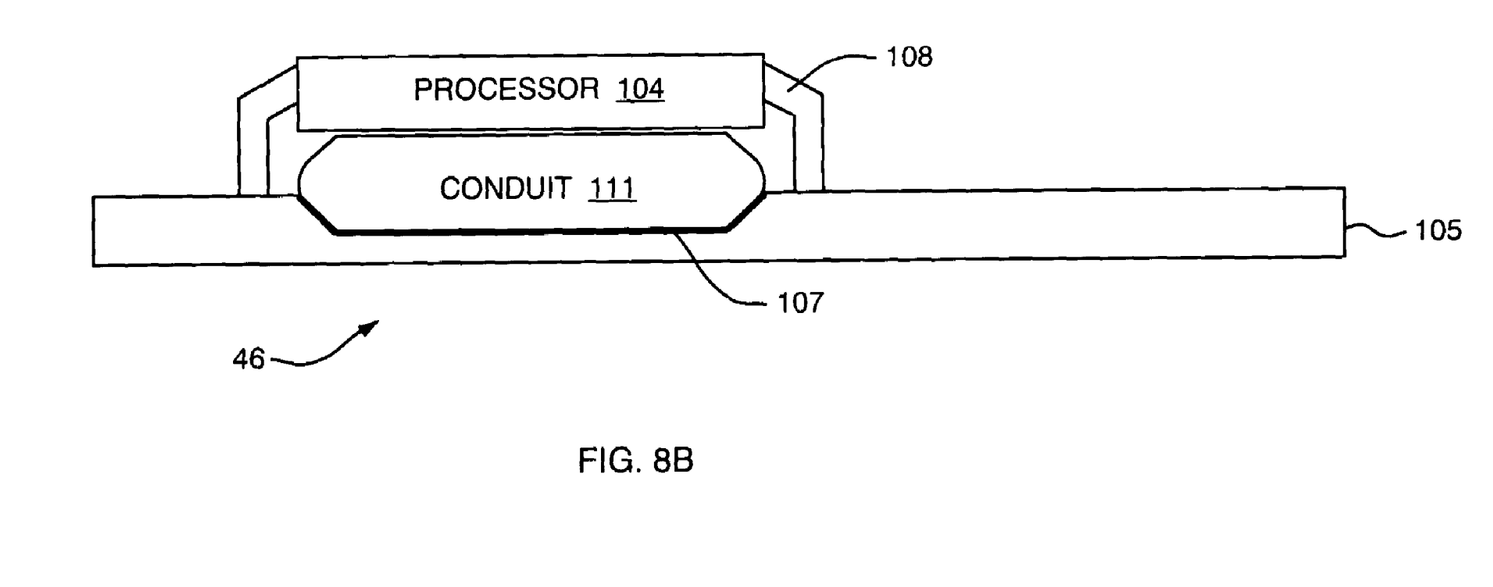
FIG. 8B is a perspective drawing of a circuit board in which heat is managed by conduction through a conduit running under a processor mounted on the circuit board.
Figure 9:
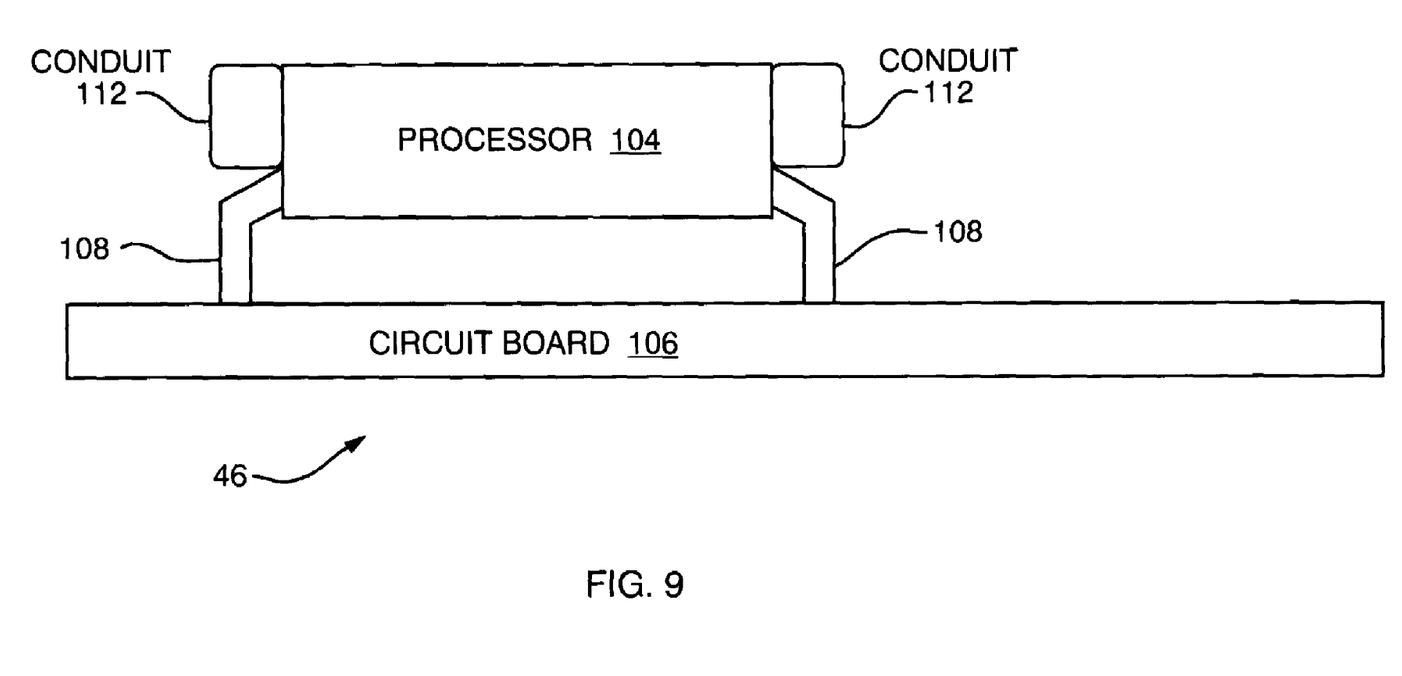
FIG. 9 is a perspective drawing of a circuit board in which heat is managed by conduction through a conduit running around the sides of the processor.

It is further possible to integrate the fluidic components with the heat-generating portion 46 of the device, if the DMFC system and the portion are mechanically integrated. FIGS. 7, 8A, 8B and 9 show different arrangements of conduits 102, 110, 111 or 112 passing in proximity to heat-generating components. In FIG. 7, conduit 102 passes over a processor 104, which is connected to a printed circuit board 106 by leads 108. Heat produced by the processor 104 is transferred to the conduit 102, which in turn transfers heat to the fluid flowing through the conduit 102 en route to or from the DMFC (not shown). In FIG. 8A, conduit 110 passes under processor 104. In FIG. 8B, conduit 111 passes under processor 104 in a channel or saddle 107 in the printed circuit board 105. In FIG. 9, conduit 112 passes around the sides of processor 104. In FIGS. 7-9 reactants may be routed though conduits 102, 110, 111 and 112 before being routed to the pump (not shown) or to the DMFC (not shown). Alternatively, a dedicated coolant may be routed through conduits 102, 110, 111 and 112.

Figure 10:
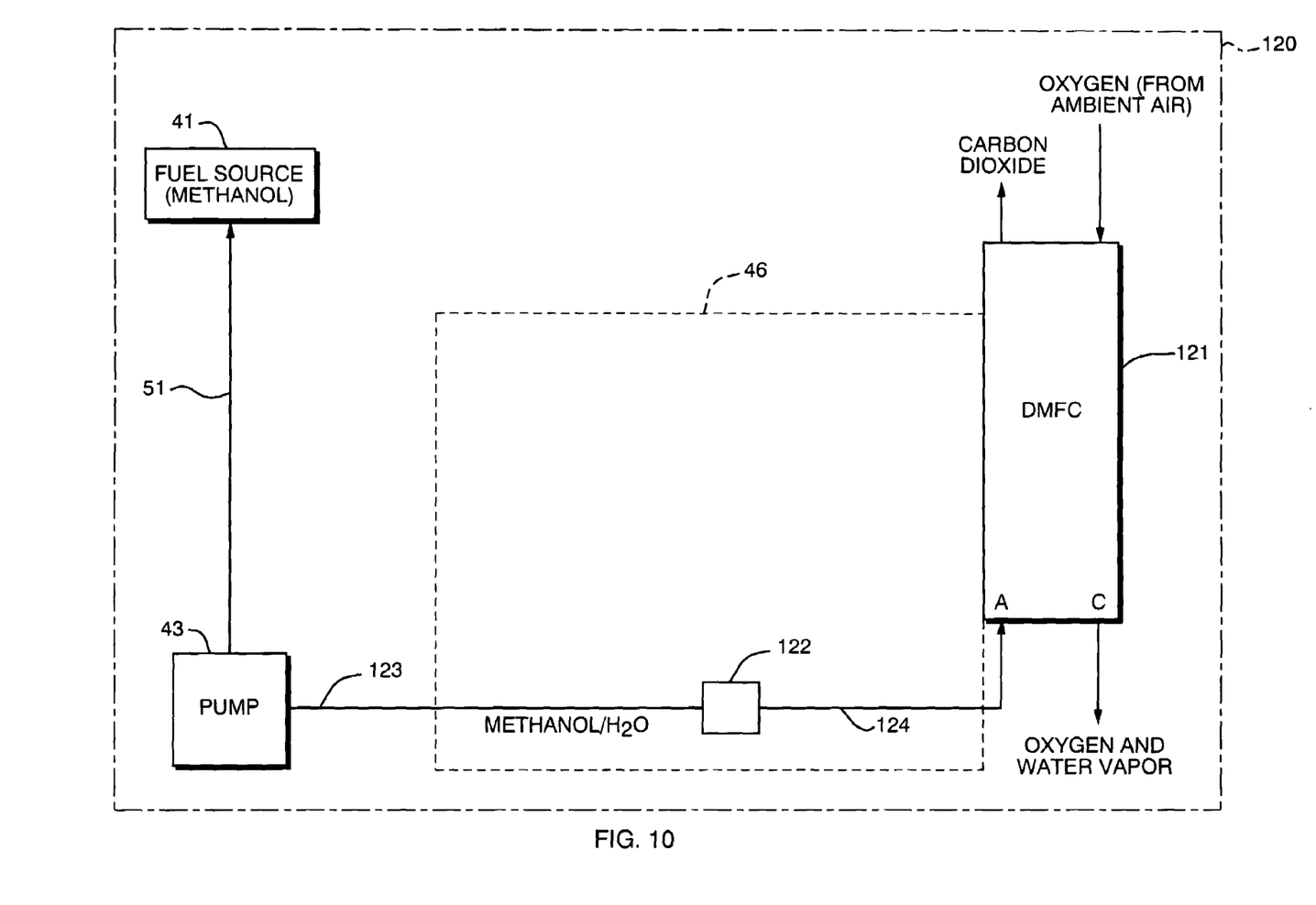
FIG. 10 is a block diagram of a direct methanol fuel cell system in which heat is managed by a heat pump/valve.

FIG. 10 shows a fifth embodiment in which a simple heat pump/valve 122 is used to assist is pumping vaporized reactants to DMFC 121. Heat is transferred from the heat-generating portion 46 to the heat pump/valve 122, which in turn transfers heat to the reactants entering the heat pump/valve 122 via conduit 123. This may result in the reactants being vaporized, after which they are routed to the DMFC 121 via conduit 124. The vaporized reactants then condense, or are reacted in vapor phase, within the DMFC 121 prior to being reacted, thereby transferring heat to the DMFC 121.

What is claimed is:

1. An apparatus for managing heat generated by a processor of a device that is powered at least in part by a direct oxidation fuel cell system, comprising:
    a direct oxidation fuel cell system that includes a direct oxidation fuel cell and at least one conduit coupled between a source of reactant and said fuel cell, said system being mechanically and electrically coupled to said device to provide power to said device, and wherein said processor of said device generates heat as it consumes power; and
    said reactant source, conduit and fuel cell being arranged in relation to the processor so as to effect heat transfer of said heat generated by said processor to said reactant during transport of said reactant through said conduit, whereby an operating temperature of said processor is regulated and an operating temperature of said direct oxidation fuel cell is raised, by heat transfer to and from said reactant.

2. The apparatus of claim 1 wherein said reactant source comprises a source of fuel and heat from said processor is transferred to fuel as such fuel is transported through said conduit prior to said fuel entering said direct oxidation fuel cell.

3. The apparatus of claim 1 wherein said reactant source comprises a source of oxidant and heat from said processor is transferred to an oxidant as such oxidant is transported through said conduit prior to said oxidant entering said direct oxidation fuel cell.

4. The apparatus of claim 1 wherein said reactant source comprises an oxygen source and heat from said processor is transferred to oxygen flowing in said conduit prior to introduction of said oxygen into said direct oxidation fuel cell.

5. The apparatus of claim 4 wherein said oxygen source comprises:
    air from the ambient environment.

6. The apparatus of claim 1 wherein said reactant source comprises a source of fuel and said fuel cell system further comprises:
    a heat pump, connected along said conduit, for transferring heat produced by said processor of said device to fuel carried by said conduit, whereby said fuel is vaporized prior to introduction into said fuel cell.

7. The apparatus of claim 1, wherein
    heat is transfened from said processor substantially by conduction.

8. The apparatus of claim 1, wherein said apparatus further comprises:
    means for transferring heat substantially from said processor using one or more products of the energy-producing reactions of said direct oxidation fuel cell.

9. The apparatus of claim 1, further comprising:
    (A) a pump; and
    (B) a conduit coupled between said direct oxidation fuel cell and said pump, said conduit arranged so as to transfer at least some of said heat from said processor of said device to reactants flowing in said conduit prior to being delivered to a membrane electrode assembly of said direct oxidation fuel cell.

10. The apparatus as defined in claim 9 wherein said conduit is of a serpentine configuration.

11. The apparatus of claim 1, wherein
    heat is transferred from said processor substantially by convection.

12. The apparatus of claim 1, wherein said direct oxidation fuel cell includes:
    (A) an anode;
    (B) a cathode;
    (C) one or more sources of reactants; and
    (D) a housing encompassing both said device and said direct oxidation fuel cell.

13. The apparatus as defined in claim 1, wherein said device is at least partially powered by said direct oxidation fuel cell system.

14. The apparatus of claim 1, wherein said device is a portable device, the temperature of which is at least partially regulated by transferring at least some of said heat from said processor to at least one of the reactants used in energy-producing reactions of the direct oxidation fuel cell, the products of the energy-producing reactions of the direct oxidation fuel cell, or the direct oxidation fuel cell itself.

15. The apparatus as defined in claim 1, further comprising:
    a valve disposed between an associated fuel source and the direct oxidation fuel cell.

* * * * *